US012783068B2

(12) United States Patent
Xie et al.

(10) Patent No.: US 12,783,068 B2
(45) Date of Patent: Nov. 3, 2026

(54) FALL-PREVENTING MOUSE

(71) Applicant: Weiyu (Shenzhen) Technology Co., Ltd., Shenzhen (CN)

(72) Inventors: Xianbang Xie, Shenzhen (CN); Qi Lin, Shenzhen (CN)

(73) Assignee: Weiyu (Shenzhen) Technology Co., Ltd., Shenzhen (CN)

( * ) Notice: Subject to any disclaimer, the term of this patent is extended or adjusted under 35 U.S.C. 154(b) by 0 days.

(21) Appl. No.: 19/292,882

(22) Filed: Aug. 6, 2025

(65) Prior Publication Data

US 2026/0072534 A1 Mar. 12, 2026

(30) Foreign Application Priority Data

Sep. 12, 2024 (CN) ......................... 202422248396.3
May 8, 2025 (CN) ......................... 202520902955.X

(51) Int. Cl.
*G06F 3/039* (2013.01)
*G06F 3/0354* (2013.01)

(52) U.S. Cl.
CPC .......... *G06F 3/039* (2013.01); *G06F 3/03541* (2013.01)

(58) Field of Classification Search
CPC ... G06F 3/039; G06F 3/03541; G06F 3/03543
See application file for complete search history.

(56) References Cited

U.S. PATENT DOCUMENTS 5,355,811 A * 10/1994 Brewer ................ A47B 23/002 108/43
5,726,684 A * 3/1998 Blankenship ......... G06F 1/1616 708/131
5,990,870 A * 11/1999 Chen .................. G06F 3/03543 345/161
6,100,874 A * 8/2000 Schena ............... G06F 3/03543 345/157

(Continued)

FOREIGN PATENT DOCUMENTS

CA 2817883 A1 * 11/2008 ......... G06F 3/03548
WO WO-2028151666 * 8/2018 ........... G06F 3/0317

OTHER PUBLICATIONS

WO-2028151666; Aug. 23, 2018; Lien Jian Yao (English Translation).*

(Continued)

*Primary Examiner* — Ricardo Osorio

(57) ABSTRACT

Disclosed is a fall-preventing mouse which includes a mouse body for connecting to a computer; and a supporting member provided on a bottom surface of the mouse body. The mouse body is detachably connected to the supporting member, an end surface of the supporting member away from the mouse body is configured as a plane for engaging with a supporting surface, and the supporting member is detachably connected to the supporting surface to facilitate the fixing or moving of the supporting member. When the mouse body is not in use, it can achieve relative fixation with the supporting member, so as to enable the mouse body to be positioned to the supporting member to be positioned (Continued)

relative to a supporting surface, thereby reducing the possibility of the mouse body falling off the supporting surface and reducing damage caused by the fall of the mouse, and improving working efficiency.

17 Claims, 7 Drawing Sheets

(56) References Cited

U.S. PATENT DOCUMENTS

| | | | | |
|---|---|---|---|---|
| 6,504,528 | B1 * | 1/2003 | Kermani | G06F 3/016<br>345/163 |
| 6,720,950 | B2 * | 4/2004 | Cheng | G06F 3/039<br>250/455.11 |
| 6,727,889 | B2 * | 4/2004 | Shaw | G06F 3/038<br>345/161 |
| 7,098,893 | B2 * | 8/2006 | Rogers | G06F 3/03543<br>345/157 |
| 8,138,717 | B2 * | 3/2012 | Chatterjee | G06F 3/0383<br>439/38 |
| 2001/0030265 | A1 * | 10/2001 | Brothers | H02G 11/00<br>248/51 |
| 2005/0219208 | A1 * | 10/2005 | Eichenberger | G06F 3/03543<br>345/157 |
| 2025/0250094 | A1 * | 8/2025 | Goodrum | B65D 37/00 |

OTHER PUBLICATIONS

CA-2817883-A1; Nov. 13, 2008; Kim Youn Soo (English Translation).*

* cited by examiner

FALL-PREVENTING MOUSE

CROSS REFERENCES TO RELATED APPLICATION

The present application claims priorities of Chinese Patent Application No. 202422248396.3 filed on Sep. 12, 2024 and No. 202520902955.X filed on May 8, 2025 the entire contents of which are hereby incorporated by reference.

TECHNICAL FIELD

The present application relates to the technical field of input devices, and more particularly, to a fall-preventing mouse.

BACKGROUND ART

With the development of electronic technology and the continuous improvement of computer-related electronic products, a mouse is one of the indispensable accessories for a computer, which is used to connect with the computer to control the cursor, making the computer more flexible for work.

During mobile working, it is usually necessary to carry a laptop computer and a mouse. With the increasing number of times of carrying, it is inevitable for the mouse to fall on the ground, or fall off a desktop due to impact during use, which makes working inconvenient. Besides, the mouse falls and is easily damaged. Although some mice can alleviate the risk of falling off the desktop or even breaking due to their connection to the computer's data cable, if the mouse body is too heavy and the data cable length is too long, there is still a situation where the mouse falls and causes damage, which affects working efficiency.

SUMMARY OF THE INVENTION

The embodiments of the present application provide a fall-preventing mouse, which can greatly reduce the possibility of dropping the mouse, reduce the damage caused by dropping the mouse, and thus improve the working efficiency.

The fall-preventing mouse provided in the present application adopts the following technical solution:

a fall-preventing mouse, including:

a mouse body for connecting to a computer; and a supporting member provided on a bottom surface of the mouse body, the mouse body being detachably connected to the supporting member to facilitate fixing or separating the mouse body relative to the supporting member, wherein an end surface of the supporting member away from the mouse body is configured as a plane for engaging with a supporting surface, and the supporting member is detachably connected to the supporting surface to facilitate fixing or separating the supporting member relative to the supporting surface.

Further, the end surface of the supporting member away from the mouse body is provided with a connecting member, the connecting member being used for fixing the supporting member to the supporting surface, so that when a force is applied to the supporting member, the supporting member can be separated from the supporting surface.

Further, the connecting member is preferably double-sided adhesive tape.

Further, the mouse body is provided with a first magnetic member, the supporting member is provided with a second magnetic member, and the first magnetic member and the second magnetic member attract each other.

Further, the first magnetic member comprises a first magnet, the first magnet being fixedly mounted on the mouse body; and the second magnetic member comprises a second magnet, the second magnet being fixedly mounted on the supporting member, and the first magnet and the second magnet attract each other magnetically.

Further, the bottom surface of the mouse body is provided with a first mounting groove, the first magnet is located in the first mounting groove, and an end surface of the first magnet close to the supporting member is located on a same plane as the bottom surface of the mouse body.

Further, an end surface of the supporting member close to the mouse body is provided with a second mounting groove, the second magnet is located in the second mounting groove, and an end surface of the second magnet close to the mouse body is located on a same plane as the end surface of the supporting member close to the mouse body.

Further, the first magnetic member further comprises a third magnet, the third magnet being fixedly mounted on the mouse body; and the second magnetic member further comprises a fourth magnet, the fourth magnet being fixedly mounted on the supporting member, and the third magnet and the fourth magnet attract each other magnetically.

Further, the first magnet and the third magnet are respectively arranged at two ends of the mouse body, the second magnet and the fourth magnet are respectively arranged at two ends of the supporting member, the first magnet and the second magnet are correspondingly arranged, and the third magnet and the fourth magnet are correspondingly arranged.

Further, the first magnet and the second magnet have a same shape and size, and the first magnet and the second magnet are arranged in a circular shape; and the second magnet and the fourth magnet have a same shape and size, and the second magnet and the fourth magnet are arranged in an arc shape.

Further, the supporting member is provided with a limiting wall, the limiting wall is enclosed to form an accommodating chamber, the mouse body is located in the accommodating chamber, and the accommodating chamber is adapted in shape and size to the mouse body.

Further, the computer is a laptop computer, the supporting surface comprises a screen back plate of the laptop computer, and the supporting member is configured to be detachably attached to the screen back plate of the laptop computer.

Further, the fall-preventing mouse further comprises a shielding member for reducing a magnetic field strength from the first magnetic member and/or the second magnetic member to a Hall switch located in the laptop computer.

Further, an effective shielding area of the shielding member with respect to the first magnetic member and/or the second magnetic member is greater than or equal to a radiation range of the first magnetic member and/or the second magnetic member.

Further, the shielding member is a plate-shaped part made of a high magnetic permeability material.

Further, the shielding member is provided at the end surface of the supporting member away from the mouse body and corresponds to a position of the second magnetic member.

Further, the shielding member covers the end surface of the supporting member away from the mouse body.

Further, the end surface of the supporting member away from the mouse body is provided with a third mounting groove, and the shielding member is fixedly mounted in the third mounting groove.

Further, the supporting member further comprises an adhesive layer, and the adhesive layer is arranged at an end surface of the shielding member close to the screen back plate and is used for detachably adhering the supporting member to the screen back plate.

Further, the adhesive layer is an adhesive layer made of hydrogel.

It can be seen from the above-mentioned technical solution that the embodiments of the present application have the following advantages:

The supporting member is detachably connected to the supporting surface, on the one hand, facilitating the fixing of the supporting member with respect to the supporting surface, and on the other hand, facilitating the mutual separation of the supporting member from the supporting surface according to the usage requirements, and then moving the supporting member to different application scenarios. The mouse body is detachably connected to the supporting member, on the one hand, enabling the mouse body to be separated from the supporting member during use, facilitating free movement of the mouse body. On the other hand, when the mouse body is not in use, it can achieve relative fixation with the supporting member, so as to enable the mouse body to be positioned to the supporting member to be positioned relative to a supporting surface, reducing the possibility of the mouse body falling off the supporting surface, and reducing damage caused by the fall of the mouse, thereby improving office efficiency.

BRIEF DESCRIPTION OF THE DRAWINGS

In order to illustrate the technical solutions in the embodiments of the present application more clearly, the following will briefly introduce the drawings that need to be used in the description of the embodiments. Obviously, the drawings in the following description are merely some embodiments of the present application. For those of ordinary skills in the art, other drawings can be obtained according to these drawings.

DESCRIPTION OF REFERENCE NUMERALS

1, mouse body; 11, first magnet; 12, first mounting groove; 13, third magnet; 2, supporting member; 21, connecting member; 22, limiting wall; 23, second magnet; 24, second mounting groove; 25, fourth magnet; 26, shielding member; 27, third mounting groove; 28, adhesive layer; 3, screen back plate; and 4, Hall switch.

DETAILED DESCRIPTION OF THE INVENTION

The present application will be described in further detail below with reference to the accompanying drawings.

The embodiments of the present application provide a fall-preventing mouse.

In order to enable those skilled in the art to better understand the solutions of the present invention, the technical solutions in the embodiments of the present invention will be clearly and completely described below in conjunction with the accompanying drawings in the embodiments of the present invention. Obviously, the described embodiments are merely part of the embodiments of the present invention, rather than all the embodiments. Based on the embodiments of the present invention, all other embodiments obtained by one of ordinary skill in the art without involving any inventive effort are intended to be within the scope of the present invention. In addition, the technical solutions between the various embodiments can be combined with each other, but must be based on what ordinary technical personnel in the art can achieve. When the combination of technical solutions conflicts or cannot be achieved, it should be considered that the combination of such technical solutions does not exist and is not within the scope of protection claimed by the present invention.

The terms "first", "second", "third", "fourth" and the like in the description and in the claims of the present invention, as well as in the above-described figures, are used for distinguishing between similar objects and not necessarily for describing a particular sequential or chronological order. It should be understood that the data used in this way can be interchanged in appropriate cases, so that the embodiments described herein can be implemented in order other than those shown or described herein. Furthermore, the terms "comprise" and "has", as well as any variations thereof, are intended to cover a non-exclusive inclusion, for example, the scenario that a process, method, system, product, or device that comprises a list of steps or units is not necessarily limited to those steps or units expressly listed, and other steps or units not expressly listed or inherent to such process, method, product, or device may be included.

Figure 1:
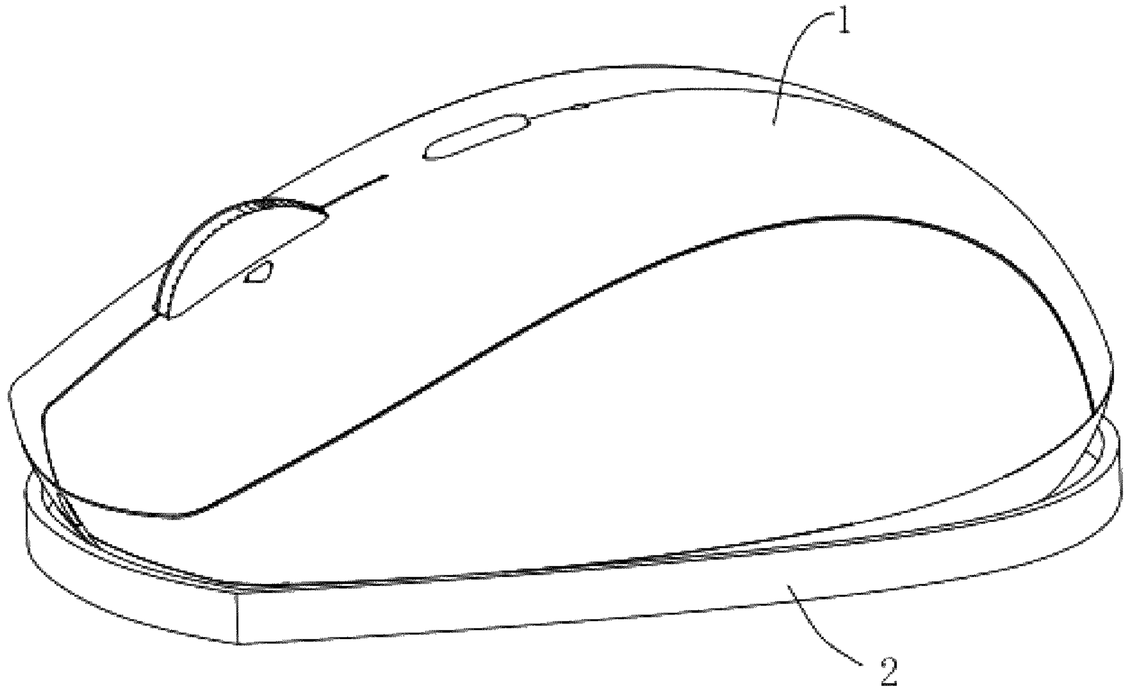
FIG. 1 is a schematic view of an overall structure of a fall-preventing mouse disclosed in an embodiment of the present application.
Figure 2:
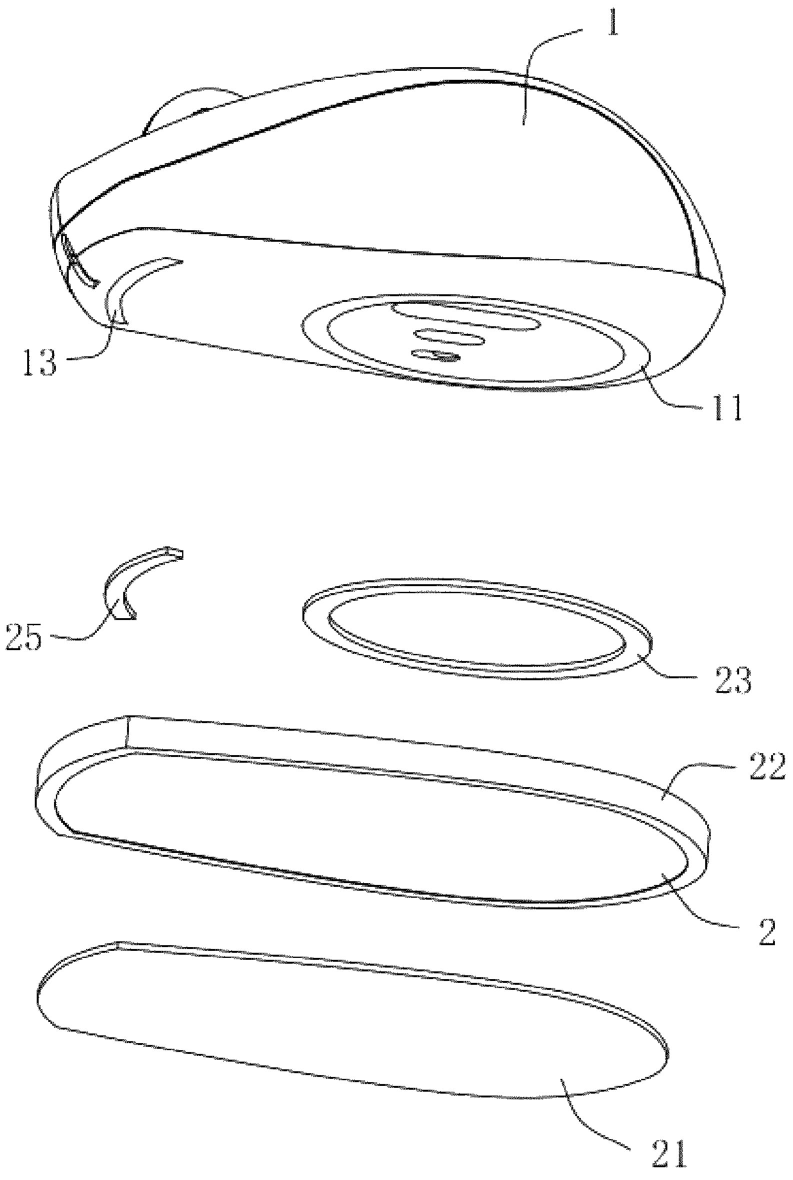
FIG. 2 is an exploded view of a structure of a fall-preventing mouse disclosed in an embodiment of the present application.

During mobile working, it is usually necessary to carry a laptop computer and a mouse. With the increasing number of times of carrying, it is inevitable for the mouse to fall on the ground, or fall off a desktop due to impact during use, which makes working inconvenient. Besides, the mouse falls and is easily damaged. Although some mice can alleviate the risk of falling off the desktop or even breaking due to their connection to the computer's data cable, if the mouse body is too heavy and the data cable length is too long, there is still a situation where the mouse falls and causes damage, which affects working efficiency. In order to solve the above-mentioned technical problem, the present application provides a fall-preventing mouse. With reference to FIGS. 1 and 2, the fall-preventing mouse in one embodiment of the present application comprises a mouse body 1 and a supporting member 2, wherein the mouse body 1 is used for connecting to a computer, and the supporting member 2 is provided on the bottom surface of the mouse body 1 and is used for supporting the mouse body 1. The mouse body 1 is detachably connected to the supporting member 2 so as to facilitate the fixing or separation of the mouse body 1 relative to the supporting member 2; and an end surface of the supporting member 2 away from the mouse body 1 is configured as a flat surface for engaging with a supporting surface, and the supporting member 2 is detachably connected with the supporting surface to facilitate fixing or moving of the supporting member 2.

It will be appreciated that the supporting surface is planar and that the supporting surface may be the upper clamshell surface of a computer, a desk surface, a dining table surface, etc. The supporting member 2 is detachably connected to the supporting surface, on the one hand, facilitating the fixing of the supporting member 2 with respect to the supporting surface, and on the other hand, facilitating the mutual separation of the supporting member 2 from the supporting surface according to the usage requirements, and then moving the supporting member 2 to different application scenarios. And the mouse body 1 is detachably connected to the supporting member 2, on the one hand, enabling the mouse body 1 to be separated from the supporting member 2 during use, facilitating free movement of the mouse body 1. On the other hand, when the mouse body 1 is not in use, it can achieve relative fixation with the supporting member 2, so as to enable the mouse body 1 to be positioned to the supporting member 2 to be positioned relative to a supporting surface, reducing the possibility of the mouse body 1 falling off the supporting surface, and reducing damage caused by the fall of the mouse, thereby improving office efficiency.

Figure 3:
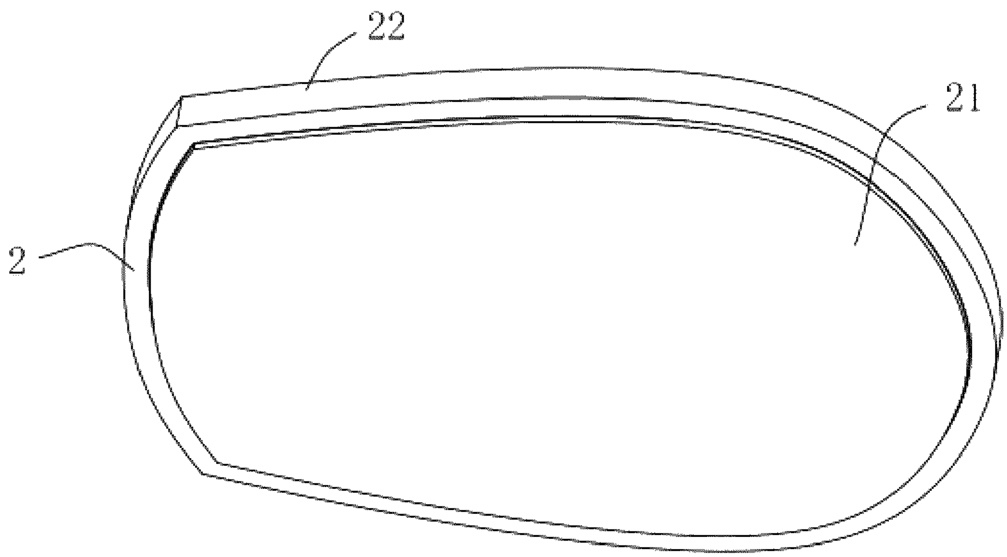
FIG. 3 is a schematic view showing a fall-preventing mouse highlighting a structure of a supporting member and a connecting member disclosed in an embodiment of the present application.

With reference to FIGS. 2 and 3, in particular, the end face of the supporting member 2 away from the mouse body 1 is provided with a connecting member 21 for fixing the supporting member 2 to the supporting surface and for applying a force to the supporting member 2 to separate the supporting member 2 from the supporting surface. The connecting member 21 is used to achieve the detachable connection between the supporting member 2 and the mouse body 1. Under the action of the connecting member 21, when it is necessary to change the usage scenario of the supporting member 2, a force can be applied to the supporting member 2 to separate it from the supporting surface, facilitating the free movement of the supporting member 2 to other usage scenarios. Alternatively, after determining the usage scenario of the supporting member 2, the relative fixation between the supporting member 2 and the supporting surface is achieved, providing a basis for fixing the mouse body 1.

In this embodiment, the connecting member 21 is preferably a double-sided adhesive tape. The double-sided adhesive tape can form an adhesive bond between the supporting member 2 and the supporting surface, achieving temporary fixation of the two. This means that the bonded objects can be easily separated when needed, making it suitable for the supporting member 2 that requires frequent replacement or adjustments of positions. Secondly, compared with traditional fixing methods such as screws and rivets, using double-sided adhesive tape can more conveniently and quickly fix the supporting member 2 to the supporting surface without the need for complex tools. Finally, double-sided adhesive bonding, as distinguished from connecting members 21 such as screws, does not leave marks or cause damage to the surface of the object, thus not damaging the surface of the object, making it suitable for use scenarios where maintaining aesthetics or avoiding damage to the surface of the object is desired.

Figure 4:
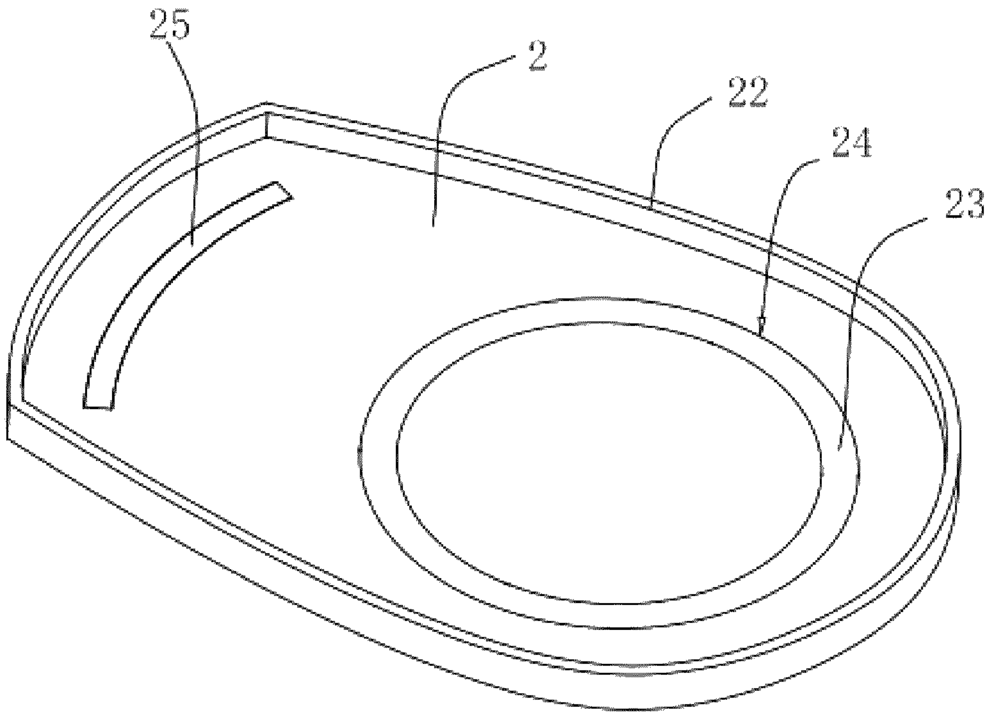
FIG. 4 is a schematic view showing a fall-preventing mouse highlighting a structure of a supporting member disclosed in an embodiment of the present application.

Referring to FIGS. 1 and 4, the supporting member 2 is provided with a limiting wall 22, and the limiting wall 22 is used for limiting the sliding of the mouse body 1 on the supporting plate and keeping the mouse body 1 stable; and the limiting wall 22 encloses to form an accommodating chamber, the mouse body 1 is located in the accommodating chamber, and the shape and size of the accommodating chamber are adapted to the mouse body 1. It can be understood that the cross-sectional area of the accommodating chamber is adapted to the shape of the end surface of the mouse body 1 that is close to the supporting member 2, and the cross-sectional area of the accommodating chamber is larger than the area of the end surface of the mouse body 1 that is close to the supporting member 2, thereby facilitating the placement of the mouse body 1 in the accommodating chamber. The height of the limiting wall 22 is smaller than the height of the mouse body 1, and the smaller the numerical value of the height of the limiting wall 22 is set, the smaller the shielding area of the side wall of the mouse body 1 is, so as to facilitate the taking and placing operations on the mouse body 1.

In the present embodiment, the mouse body 1 is a wireless mouse. The wireless mouse refers to a mouse that is directly connected to a host computer without a cable, and which communicates with the computer using a wireless technology, thereby dispensing with the binding of wires. The wireless mouse can be directly placed in the accommodating chamber, so as to limit the sliding or even falling of the mouse body 1 from the supporting surface. In other embodiments, the mouse body 1 may also be a wired mouse, the position of the limiting wall 22 corresponding to the data cable is provided with an avoiding groove, and the avoiding groove is used for avoiding the data cable of the wired mouse, so that the wired mouse can also be smoothly placed in the accommodating chamber and fit the supporting member 2.

Figure 5:
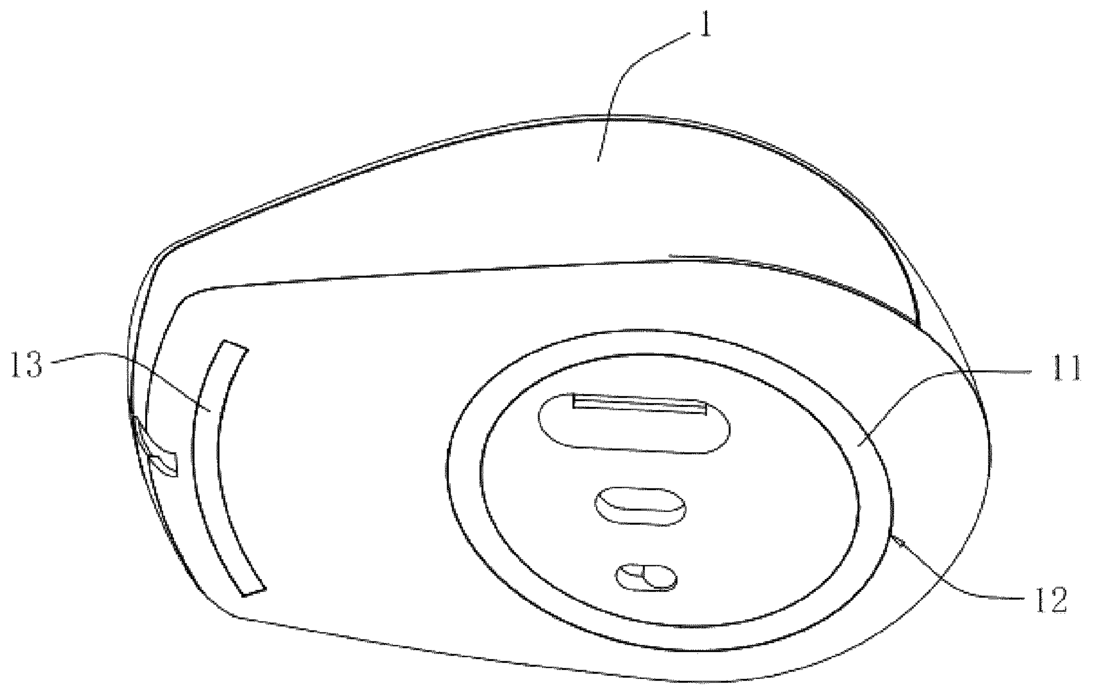
FIG. 5 is a schematic view showing a fall-preventing mouse highlighting structures of a first magnet and a third magnet disclosed in an embodiment of the present application.

Referring to FIGS. 4 and 5, the mouse body 1 is provided with a first magnetic member (11,13), the supporting member is provided with a second magnetic member (23, 25), and the first magnetic member (11,13) and the second magnetic member (23, 25) are attracted to each other. In particular, the first magnetic member (11,13) comprises a first magnet 11 fixedly mounted to the mouse body 1; and the second magnetic member (23, 25) comprises a second magnet 23 fixedly mounted to the supporting member 2, and the first magnet 11 and the second magnet 23 are magnetically attracted to each other. It can be understood that magnetic attraction is a connection mode realized by magnetic force, and the first magnet 11 and the second magnet 23 are magnetically attracted to each other so that the mouse body 1 and the supporting member 2 can be attracted to each other by magnetic force and remain connected. At that, when the mouse body 1 is not in use, the relative fixing between the mouse body 1 and the supporting member 2 can be realized. The mouse body 1 is positioned to the supporting member 2 so as to be positioned relative to the supporting surface, reducing the possibility of the mouse body 1 falling off the supporting surface; and when the mouse body 1 is required to be used, the mouse body 1 can be separated from the supporting member 2 by applying a pulling force greater than the magnetic attraction force to the mouse body 1, so that the mouse body 1 can be freely moved. Compared with the traditional mechanical connection, the magnetic connection has the advantages of quickness, convenience and no need for an additional locking mechanism.

Further, the bottom surface of the mouse body 1 is provided with a first mounting groove 12, the shape and size of the first mounting groove 12 are adapted to the first magnet 11, the first magnet 11 is located in the first mounting groove 12, and the end surface of the first magnet 11 near to the supporting member 2 is located in the same plane as the bottom surface of the mouse body 1. The arrangement of the first mounting groove 12 enables the end surface of the first magnet 11 that is close to the supporting member 2 to be flush with the bottom surface of the mouse body 1, reducing the possibility that during the use of the mouse body 1, the first magnet 11 causes the mouse body 1 to be unable to fit the supporting surface, which would otherwise affect the use of the mouse body 1. And a second mounting groove 24 is provided on the end surface of the supporting member 2 which is close to the mouse body 1, the shape and size of the second mounting groove 24 are adapted to the second magnet 23, the second magnet 23 is located in the second mounting groove 24, and the end surface of the second magnet 23 which is close to the mouse body 1 and the end surface of the supporting member 2 which is close to the mouse body 1 are located in the same plane. The second mounting groove 24 is arranged such that the end surface of the second magnet 23 which is close to the mouse body 1 is flush with the supporting member 2.

Referring to FIGS. 4 and 5, the first magnetic member (11,13) further includes a third magnet 13 fixedly mounted to the mouse body 1; and the second magnetic member (23, 25) further includes a fourth magnet 25 fixedly mounted to the supporting member 2, and the third magnet 13 and the fourth magnet 25 magnetically attract each other. The third magnet 13 and the fourth magnet 25 are arranged to further enhance the magnetic attraction force between the mouse body 1 and the supporting member 2, thereby enhancing the stability of the mouse body 1 on the supporting member 2. The arrangement of the third magnet 13 and the fourth magnet 25 is the same as that of the first magnet 11 and the second magnet 23, i.e., the end surface of the third magnet 13 close to the supporting member 2 is flush with the bottom surface of the mouse body 1, and the end surface of the fourth magnet 25 close to the mouse body 1 is flush with the supporting member 2. So, no further description is provided.

In this embodiment, the first magnet 11 and the third magnet 13 are respectively arranged at two ends of the mouse body 1, the second magnet 23 and the fourth magnet 25 are respectively arranged at two ends of the supporting member 2, the first magnet 11 is arranged corresponding to the second magnet 23, and the third magnet 13 is arranged corresponding to the fourth magnet 25, which is beneficial for quickly achieving magnetic attraction between the two ends of the mouse body 1 and the supporting member 2, thereby realizing a magnetic attraction connection between the mouse body 1 and the supporting member 2, and thus enhancing the stability between the mouse body 1 and the supporting member 2. The first magnet 11 and the second magnet 23 have the same shape and size and are arranged in a circular shape, the second magnet 23 and the fourth magnet 25 have the same shape and size and are arranged in an arc shape, and the shapes of the first magnet 11 and the third magnet 13 are adapted to the volume and size of the two ends of the mouse body 1.

Since a Hall switch is usually provided in a laptop computer, after being triggered, it is transmitted to a controller on the mainboard through a logic circuit to enter a power-saving mode, such as entering a sleep mode or turning off the screen. The core function of the Hall switch depends on its ability to respond to a magnetic field. However, when the fall-preventing mouse of this application is used for a laptop computer, if the fall-preventing mouse with a magnetic member is placed near the Hall switch or mounted to a screen back plate near the Hall switch, the magnetic field generated by the magnetic member built into the mouse kit may affect the Hall element mounted nearby, potentially causing false triggering of the Hall switch. That may lead to the computer turning off the screen, thereby affecting the user's working efficiency.

Figure 6:
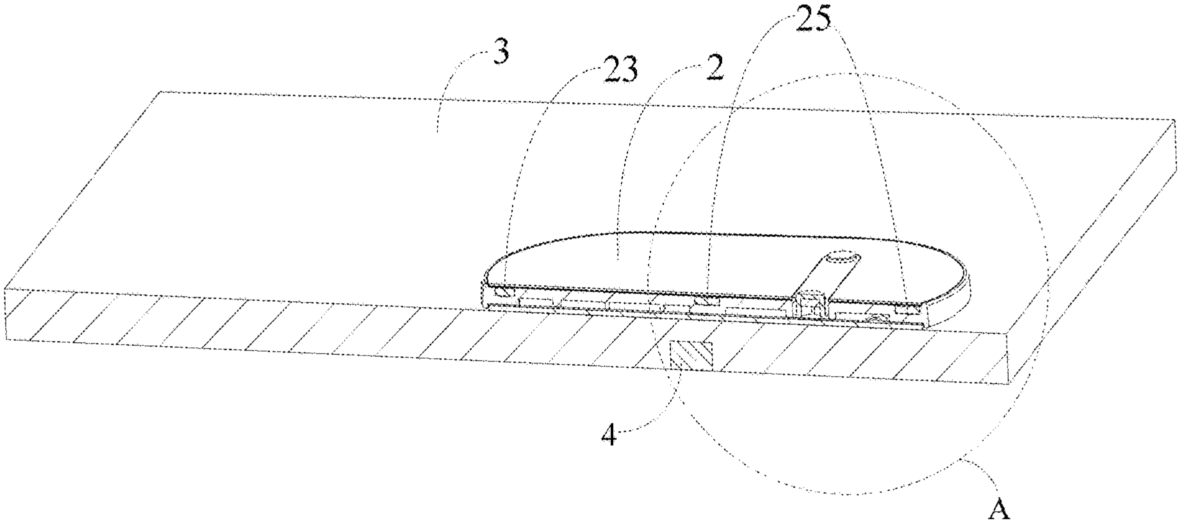
FIG. 6 is a schematic view showing a structure of a fall-preventing mouse mounted to a screen back plate as disclosed in an embodiment of the present application.
Figure 7:
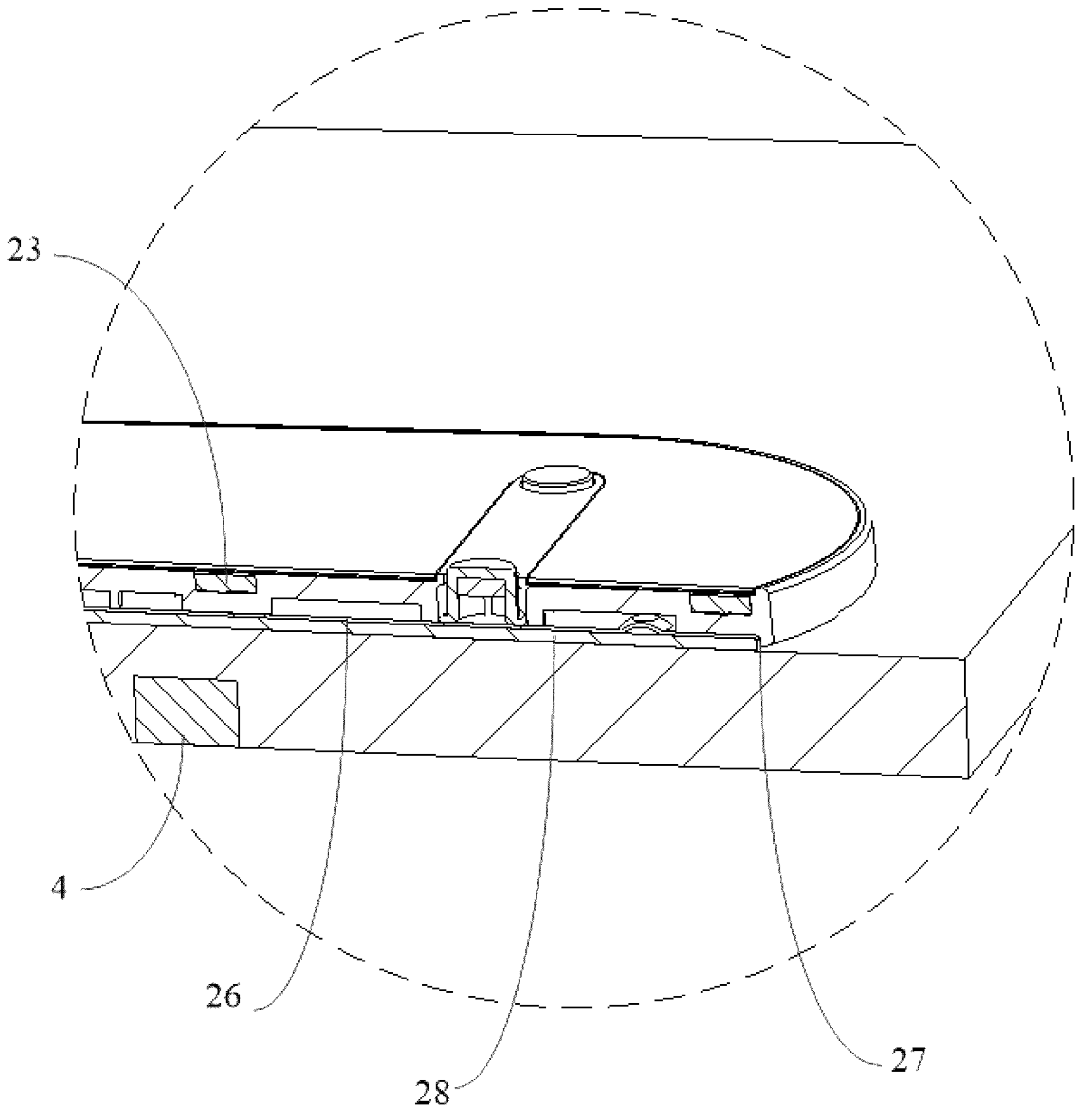
FIG. 7 is an enlarged view of A in FIG. 6.

To solve the above problem, as shown in FIG. 6 and FIG. 7, the fall-preventing mouse of this embodiment further includes a shielding member 26, which is used to reduce the magnetic field strength from the first magnetic member (11,13) and/or the second magnetic member (23, 25) to the Hall switch. When the mouse body 1 and the supporting member 2 are attracted together by the first magnetic member (11,13) and the second magnetic member (23, 25), the positions where the first magnetic member (11,13) and the second magnetic member (23, 25) are arranged correspond to each other. The second magnetic member (23, 25) will be used as an example for the explanation below.

It needs to be emphasized that the core function of the Hall switch depends on its ability to respond to a magnetic field. Only when the external magnetic field reaches a certain strength, can the Hall element be effectively excited. If the external magnetic field is too weak, it may not be triggered. Providing the shielding member 26 can effectively guide and absorb magnetic field lines such that an isolation layer is formed between the second magnetic member (23, 25) and the Hall switch to reduce the actual magnetic field strength passing through the shielding member 26 and reaching the Hall switch, thereby limiting the diffusion of the magnetic field strength emitted by the second magnetic member (23, 25) to the Hall switch and preventing unnecessary interference. This reduces the possibility of false triggering of the Hall switch by the fall-preventing mouse, improves user satisfaction, and enhances working efficiency.

Further, the shielding member 26 is provided corresponding to the second magnetic member (23, 25), and the effective shielding area of the shielding member 26 with respect to the second magnetic member (23, 25) is greater than or equal to the radiation range of the second magnetic member (23, 25). When the coverage area of the shielding member 26 is greater than or equal to the radiation range of the second magnetic member (23, 25), the stray field leakage can be blocked to avoid interfering with the normal operation of the Hall switch. It needs to be emphasized that the effective shielding area of the shielding member 26 is larger than the radiation area of the second magnetic member (23, 25), thereby ensuring the complete coverage of the magnetic induction line diffusion range, and appropriately enlarging the effective shielding area of the shielding member 26 with respect to the second magnetic member (23, 25), and contributing to further enhancing the shielding effectiveness of the shielding member 26. In the present embodiment, the shielding member 26 is provided in the form of a plate, and the shielding member 26 completely covers the bottom surface of the supporting member 2. In other embodiments, the shielding member 26 may be disposed only in a position corresponding to the second magnetic member (23, 25), and the area occupied by the shielding member 26 is at least 1.5 times the area occupied by the second magnetic member (23, 25).

The shielding member 26 is a high permeability shielding member 26 that is made of a material having a high magnetic permeability, making it effective to guide and absorb magnetic field lines, thereby reducing the actual magnetic field strength that passes through the shielding member 26 and reaches the Hall switch. High permeability materials primarily include soft iron, permalloy, or other application metals specifically designed for electromagnetic shielding. It will be appreciated that by selecting a material having a high magnetic permeability and placing the same between the second magnetic member (23, 25) and the Hall switch, the shielding member 26 is able to direct most of the magnetic flux through itself rather than through the Hall switch area, thereby providing isolation and reducing the likelihood of false triggering of the Hall switch by the fall-preventing mouse.

With continued reference to FIG. 6, in the present embodiment, the end surface of the supporting member 2 facing the screen back plate is provided with a third mounting groove 27, the shielding member 26 is arranged in the third mounting groove 27, and the shielding member 26 is fixedly connected to the supporting member 2. The shielding member 26 is arranged on the supporting member 2, so that when the supporting member 2 is mounted to the screen back plate, the shielding member 26 can move synchronously with the supporting member 2. Secondly, the shielding member 26 is closely attached to the second magnetic member (23, 25) without requiring additional space, making it suitable for miniaturized mouse devices. At the same time, the shielding member 26 can be constructed as a high-permeability material encasing the second magnetic member (23, 25), forming a closed magnetic circuit such that more than 90% of the magnetic flux lines can be confined within the shielding member 26.

In the present embodiment, in order to achieve a detachable connection between the supporting member 2 and the screen back plate 3, the supporting member 2 further comprises an adhesive layer 28. The adhesive layer 28 is provided on one side of the shielding member 4 close to the screen back plate 3, and the adhesive layer 28 is used for adhering the whole supporting member 2 to the screen back plate 3. The adhesive layer 28 is preferably hydrogel; by arranging the adhesive layer 28, the supporting member 2 can be mounted to the screen back plate 3 according to usage habits; when the position of the supporting member 2 needs to be replaced, the supporting member 2 is separated from the screen back plate by separating the adhesive layer 28, so that the supporting member 2 and the screen back plate are not damaged; and secondly, the adhesive layer 28 can be reused, and after the supporting member 2 is separated from the screen back plate and a new fixing position is determined, the secondary fixing between the supporting member 2 and the screen back plate can be realized through the adhesive layer 28.

As stated above, the above embodiments are merely illustrative of the technical solutions of the present invention and are not intended to be limiting thereof; although the present invention has been described in detail with reference to the foregoing examples, those skilled in the art will appreciate that: the technical solutions recited concerning the above examples can still be modified, or some of the technical features thereof can be equivalently replaced; such modifications or substitutions do not depart the nature of the corresponding technical solutions from the spirit and scope of the various examples and technical solutions of the present invention.

The invention claimed is:

1. A fall-preventing mouse, comprising:

a mouse body for connecting to a laptop computer; and a supporting member provided on a bottom surface of the mouse body, the mouse body being detachably connected to the supporting member to facilitate fixing or separating the mouse body relative to the supporting member, wherein an end surface of the supporting member away from the mouse body is configured as a plane for engaging with a supporting surface, and the supporting member is detachably connected to the supporting surface to facilitate fixing or separating the supporting member relative to the supporting surface;

wherein the mouse body is provided with a first magnetic member, the supporting member is provided with a second magnetic member, and the first magnetic member and the second magnetic member attract each other;

wherein the supporting surface comprises a screen back plate of the laptop computer, and the supporting member is configured to be detachably attached to the screen back plate of the laptop computer;

wherein the fall-preventing mouse further comprises a shielding member for reducing a magnetic field strength from the first magnetic member and/or the second magnetic member to a Hall switch located in the laptop computer.

2. The fall-preventing mouse according to claim 1, wherein the end surface of the supporting member away from the mouse body is provided with a connecting member, the connecting member being used for fixing the supporting member to the supporting surface, so that when a force is applied to the supporting member, the supporting member can be separated from the supporting surface.

3. The fall-preventing mouse according to claim 2, wherein the connecting member is preferably double-sided adhesive tape.

4. The fall-preventing mouse according to claim 1, wherein the first magnetic member comprises a first magnet, the first magnet being fixedly mounted on the mouse body; and the second magnetic member comprises a second magnet, the second magnet being fixedly mounted on the supporting member, and the first magnet and the second magnet attract each other magnetically.

5. The fall-preventing mouse according to claim 4, wherein the bottom surface of the mouse body is provided with a first mounting groove, the first magnet is located in the first mounting groove, and an end surface of the first magnet close to the supporting member is located on a same plane as the bottom surface of the mouse body.

6. The fall-preventing mouse according to claim 4, wherein an end surface of the supporting member close to the mouse body is provided with a second mounting groove, the second magnet is located in the second mounting groove, and an end surface of the second magnet close to the mouse body is located on a same plane as the end surface of the supporting member close to the mouse body.

7. The fall-preventing mouse according to claim 4, wherein the first magnetic member further comprises a third magnet, the third magnet being fixedly mounted on the mouse body; and the second magnetic member further comprises a fourth magnet, the fourth magnet being fixedly mounted on the supporting member, and the third magnet and the fourth magnet attract each other magnetically.

8. The fall-preventing mouse according to claim 7, wherein the first magnet and the third magnet are respectively arranged at two ends of the mouse body, the second magnet and the fourth magnet are respectively arranged at two ends of the supporting member, the first magnet and the second magnet are correspondingly arranged, and the third magnet and the fourth magnet are correspondingly arranged.

9. The fall-preventing mouse according to claim 8, wherein the first magnet and the second magnet have a same shape and size, and the first magnet and the second magnet are arranged in a circular shape; and the second magnet and the fourth magnet have a same shape and size, and the second magnet and the fourth magnet are arranged in an arc shape.

10. The fall-preventing mouse according to claim 1, wherein the supporting member is provided with a limiting wall, the limiting wall is enclosed to form an accommodating chamber, the mouse body is located in the accommodating chamber, and the accommodating chamber is adapted in shape and size to the mouse body.

11. The fall-preventing mouse according to claim 1, wherein an effective shielding area of the shielding member with respect to the first magnetic member and/or the second magnetic member is greater than or equal to a radiation range of the first magnetic member and/or the second magnetic member.

12. The fall-preventing mouse according to claim 1, wherein the shielding member is a plate-shaped part.

13. The fall-preventing mouse according to claim 12, wherein the shielding member is provided at the end surface of the supporting member away from the mouse body and corresponds to a position of the second magnetic member.

14. The fall-preventing mouse according to claim 12, wherein the shielding member covers the end surface of the supporting member away from the mouse body.

15. The fall-preventing mouse according to claim 14, wherein the end surface of the supporting member away from the mouse body is provided with a third mounting groove, and the shielding member is fixedly mounted in the third mounting groove.

16. The fall-preventing mouse according to claim 15, wherein the supporting member further comprises an adhesive layer, and the adhesive layer is arranged at an end surface of the shielding member close to the screen back plate and is used for detachably adhering the supporting member to the screen back plate.

17. The fall-preventing mouse according to claim 16, wherein the adhesive layer is an adhesive layer made of hydrogel.

* * * * *